United States Patent [19]

Quinet

[11] Patent Number: 5,114,733
[45] Date of Patent: May 19, 1992

[54] PROCESS FOR PREPARING A SALAD PRODUCT AND AN EMULSION THEREFOR

[75] Inventor: René Quinet, Oostende, Belgium

[73] Assignee: Revi N.V., Oostende, Belgium

[21] Appl. No.: 534,675

[22] Filed: Jun. 7, 1990

[30] Foreign Application Priority Data

Jun. 8, 1989 [BE] Belgium .............................. 8900625

[51] Int. Cl.$^5$ .............................................. A23L 1/24
[52] U.S. Cl. ................................... 426/605; 426/404; 426/407; 426/521
[58] Field of Search ............... 426/521, 407, 404, 399, 426/602, 604, 605

[56] References Cited

U.S. PATENT DOCUMENTS

| | | | |
|---|---|---|---|
| Re. 29,137 | 2/1977 | Mohwinkel | 426/521 |
| 3,197,311 | 7/1965 | Dajany | 99/100 |
| 3,454,405 | 7/1969 | Beach | 99/188 |
| 3,804,957 | 4/1974 | Purves | 426/605 |
| 4,129,663 | 12/1978 | Jamison et al. | 426/613 |
| 4,175,142 | 11/1979 | Hahn et al. | 426/605 |
| 4,191,787 | 3/1980 | Bauermann | 426/615 |
| 4,423,084 | 12/1983 | Trainor et al. | 426/605 |
| 4,426,395 | 1/1984 | Sakai et al. | 426/605 |
| 4,430,352 | 2/1984 | Postner | 426/407 |
| 4,505,937 | 3/1985 | Demeulemeester et al. | 426/521 |
| 4,596,715 | 6/1986 | Ballard et al. | 426/605 |
| 4,770,892 | 9/1988 | Grealy et al. | 426/613 |

OTHER PUBLICATIONS

Food Science, Third edition, Norman Potter, AVI Publishing Co. Inc. p. 54, 1978.

*Primary Examiner*—Donald E. Czaja
*Assistant Examiner*—Jean L. Aberle
*Attorney, Agent, or Firm*—Renner, Otto, Boisselle & Sklar

[57] ABSTRACT

The invention relates to a process for preparing a salad product not requiring any preservative, including the steps of:

i) preparing an oil emulsion, wherein:
  ia) a mixture is prepared of a part of the oil, emulsifier, stabilizer and thickener;
  ib) water is added;
  ic) a pre-emulsion is prepared under vacuum;
  id) the remainder of the oil and any seasonings are added to the pre-emulsion and emulsified under vacuum;
  ie) egg-yolk is added and the mixture is emulsified under vacuum to the oil emulsion;
ii) preparing a salad mixture from the oil emulsion and salad ingredients;
iii) placing and airtight closing of the salad mixture in a container;
iv) pasteurizing the container with the salad mixture under increased pressure;
v) cooling the pasteurized salad product, and to salad products obtained therewith.

20 Claims, No Drawings

PROCESS FOR PREPARING A SALAD PRODUCT AND AN EMULSION THEREFOR

TECHNICAL FIELD

The present invention relates to a process for preparing a salad product which, cooled without use of preservative, possesses a long shelf-life, taste stability and color fastness. The invention relates more particularly to a process for preparing a salad product based on a salad mixture consisting of salad constituents and an oil emulsion, which salad mixture is pasteurized and cooled so that the salad product has a very low germ value.

BACKGROUND OF THE INVENTION

Known retort salad products usually contain preservatives and are furthermore sterilized.

An important aspect of the present invention relates to the oil emulsion which has a composition and is prepared in a manner such that during pasteurization the oil emulsion does not separate.

SUMMARY OF THE INVENTION

The process for preparing the salad product according to the invention which contains no preservative and has a long shelf-life after pasteurization comprises the steps of:
i) preparing and oil emulsion, wherein:
  ia) a mixture is prepared of a portion of the oil, emulsifier, stabilizer and thickener;
  ib) water is added;
  ic) a pre-emulsion is prepared under vacuum;
  id) the remainder of the oil and any seasonings are added to the pre-emulsion and emulsified under vacuum;
  ie) egg-yolk is added and the mixture is emulsified under vacuum to the oil emulsion;
ii) preparing a salad mixture from the oil emulsion and salad ingredients;
iii) placing and airtight closing of the salad mixture in a container;
iv) pasteurizing the container with the salad mixture under increased pressure;
v) cooling the pasteurized salad product.

Another aspect of the present invention is a process for preparing an oil emulsion according to step i).

DETAILED DESCRIPTION OF THE INVENTION

It is required for the preparation of the oil emulsion that in the first instance a pre-emulsion is prepared having as base a portion of the total quantity of oil, emulsifier, stabilizer, thickener and water to be used. The portion of the total quantity of oil in step ia) is generally 2-15%, preferably 5-10%, of the total quantity of oil used in step i). This whole is emulsified under vacuum whereby the inclusion of air is avoided as far as possible.

As oil can be used the conventional edible oils, including soybean oil, olive oil and the like.

For the emulsifier use can be made of standard emulsifiers, such as those based on lactoprotein, namely sodium caseinate.

As stabilizer can be used common stabilizers for raw foodstuff products such as those on a base of Guar kernel flour, St. John's bread kernel flour, Carrageen and starch, separately or in combination and optionally standardized with sugar, such as the stabilizers E420, E410 and E407.

As thickener can be used thickeners which are dispersible in cold water and which viscosify at a temperature below 80° C., namely thickeners having starch as base, namely maize starch, for instance esterified maize starch such as acetylated di starch adipate.

It is noted that a number of the mentioned active ingredients can be used equally well as emulsifier, stabilizer or thickener. The products obtainable under the E-numbers E322 to E495 inclusive can in principle be used.

The preparation of the pre-emulsion takes place under vacuum, for instance at a pressure of 0.8 bar.

To the formed pre-emulsion is added the remainder of the oil and any seasonings, the type and quantities of which are geared to the salad products to be prepared. Some seasonings which can be mentioned are sugar, salt, vinegar, mustard, spices, flavourings and the like.

It is preferred that the egg-yolk is added only after preparation of an emulsion containing all oil, water, stabilizer, emulsifier, thickener and seasonings. Should egg-yolk be added at an earlier stage in the preparation of the oil emulsion, an emulsion can result displaying a lesser heat-stable character and which can separate during pasteurization.

In one embodiment of the present invention, the oil emulsion formed in step ie) possesses the following composition (in % by weight):

| | |
|---|---|
| oil | $\leq 70$ |
| water | 10–80 |
| egg-yolk | 2–10 |
| stabilizer | 0.1–5 |
| thickener | 0.1–5 |
| emulsifier | 0.1–5 |
| seasonings | 5–10. |

In another embodiment of the present invention, the oil emulsion formed in step ie) possesses the following composition (in % by weight):

| | |
|---|---|
| oil | 20–75 |
| water | 20–70 |
| egg-yolk | 2–7 |
| stabilizer | 0.2–1 |
| thickener | 0.2–5 |
| emulsifier | 0.2–5 |
| seasonings | 8–15. |

In yet another embodiment of the present invention, the oil emulsion formed in step ie) possesses the following composition (in % by weight):

| | |
|---|---|
| oil | 25–75 |
| water | 20–70 |
| egg-yolk | 2–5 |
| stabilizer | 0.2–1 |
| thickener | 0.5–2.5 |
| emulsifier | 0.5–2.0 |
| seasonings | 8–15. |

A salad mixture is subsequently prepared that consists of the above described oil emulsion and salad ingredients that are determined by the salad product for preparation.

As salad constituents can be used fruits, vegetables, meat, fish, poultry and shell-fish, and even mixtures thereof. The quantities of the various salad ingredients are geared to the taste of the consumer of the salad product.

The salad mixture is then transferred into a container, preferably a plastic container, and closed off with a covering foil, for instance an aluminium or plastic foil. It is important that the container and the covering foil possess individual and mutual properties such that during the pasteurization and vacuum treatment the salad mixture remains closed off in the container from the outside environment.

The salad mixture closed airtight in the container is subsequently pasteurized at a temperature and overpressure and for a time such that the germ value of the salad mixture is greatly reduced and there occur substantially no permanent changes of shape in the container. The pasteurization can for instance be performed in a so-called stock autoclave.

During the pasteurization a core temperature for the salad mixture in the container is reached for approximately 10 to 30 minutes of 58°-98° C., preferably 65°-90° C. and more preferably 70°-80° C. Pasteurization takes place at an overpressure of 0.5-2.0 bar, this depending on the build-up of pressure in the product which is at least partially compensated by means of the overpressure in order to avoid permanent changes of shape and opening of the product.

After pasteurization the salad mixture is cooled in the container to a core temperature of 10°-15° C., wherefore a cooling time in the order of 30-90 minutes is required. An overpressure is also applied in this case in order to avoid permanent changes of shape and opening of the product during cooling. The cooling step may, for example, be performed at a cooling temperature of 20°-5° C. and an overpressure of 0.5-2 bar. Typically, the cooling time amounts to 30-90 minutes.

It will be apparent that the pasteurization conditions and the cooling conditions are dependent on the quantity and on the specific thermal conduction of the salad mixture held in the closed container.

The table below shows, subject to the packaging size, the pasteurization time at a pasteurizing temperature of 78° C. and an overpressure of 1.75 bar. The cooling time is also stated.

TABLE 1

| Packaging size (g) | Pasteurization time (min) | Cooling time (min) |
|---|---|---|
| 150 | 50 | 50 |
| 200 | 60 | 60 |
| 250 | 84 | 70 |
| 1000 | 84 | 70 |

The shelf-life of diverse types of salad according to the invention is determined in accordance with a number of microbiological determining methods.

Ten grams of the salads mentioned in table 2 are transferred into a sterile plastic bag to which is added 90 ml of a sterile physiological saline solution. The content is well shaken for 1 minute, whereafter, using the same physiological saline solution, a decimal dilution series is applied. 1 ml at a time of a dilution series is transferred to a sterile petri dish and mixed with 10-15 ml of a liquid, sterile culture medium (temperature c. 50° C.) and, after solidifying of the culture medium, is incubated for an indicated time. Petri dishes of 25-300 colonies are counted and the number of microorganisms per gram of salad is calculated.

The determining of the total, aerobic, mesophilic germ value (TAB) was carried out with plate count agar (trademark OXOID) as culture medium, incubation time 72 hours at 30° C.

The number of enterobacteriaceae (entero) was determined with violet red bile glucose agar (trademark OXOID, incubation time 24 hours at 37° C.).

The number of coliform bacteria was determined using the culture medium violet red bile agar (trademark OXOID) after incubation for 24 hours at 37° C.

The number of yeasts and moulds (G+S) was determined with the culture medium rose bengal chloramphenicol after incubation for 7 days at 20° C.

TABLE 2

| Type of salad | TAB/g (days) | | |
|---|---|---|---|
| | 5 | 30 | 90 |
| raw foodstuffs | $4.6 \times 10^2$ | $5.3 \times 10^2$ | $1.8 \times 10^2$ |
| coleslaw | $1.2 \times 10^2$ | $1.3 \times 10^2$ | $3.6 \times 10^2$ |
| cucumber | 60 | 60 | $1.2 \times 10^3$ |
| celery | $1.9 \times 10^2$ | $2.9 \times 10^2$ | $1.2 \times 10^3$ |
| potato + bacon | 80 | $2 \times 10^2$ | $4.4 \times 10^3$ |
| potato plain | 30 | $1.3 \times 10^2$ | $2.8 \times 10^3$ |
| salmon | $2.5 \times 10^3$ | $4 \times 10^3$ | $5.1 \times 10^3$ |
| chicken | $3 \times 10^2$ | $1.9 \times 10^3$ | $2.9 \times 10^3$ |
| meat | $2.2 \times 10^3$ | $9 \times 10^3$ | $9 \times 10^3$ |

Note: after 5, 30 and 90 days the germ value in all salads was for entero, coliform and G + S respectively smaller than 10, smaller than 10 and smaller than 100.

From table 2 can be seen that the salad products according to the invention can be kept at refrigerator temperature for at least 3-6 months.

Mentioned in table 3 below are three emulsions which can withstand a pasteurization in contact with the salad ingredients, despite the presence of egg-yolk and nevertheless not display any emulsion separation.

TABLE 3

| Constituent | Emulsion 1 | Emulsion 2 | Emulsion 3 |
|---|---|---|---|
| water | 15 | 29 | 52 |
| soybean oil | 69 | 50 | 28 |
| stabilizers | 0.25 | 0.8 | 0.7 |
| thickener | 0.5 | 1.6 | 2.0 |
| emulsifier | 0.15 | 0.7 | 0.5 |
| egg-yolk | 4.4 | 4.5 | 4.6 |
| sugar | 2.5 | 4.0 | 3.1 |
| salt | 0.6 | 1.2 | 0.6 |
| vinegar 8% | 4.4 | 6.0 | 6.1 |
| mustard | 2.5 | 2.5 | 2.6 |

I claim:

1. A process for preparing a stable pasteurized salad product not requiring any preservative, comprising the steps of:
   i) preparing an oil emulsion comprising oil, emulsifier, stabilizer, thickener, water, any seasonings, and egg-yolk, wherein:
      ia) a mixture is prepared of a part of the oil, emulsifier, stabilizer and thickener;
      ib) water is added;
      ic) a pre-emulsion is prepared under vacuum;
      id) the remainder of the oil and any seasonings are added to the pre-emulsion under vacuum; and then
      ie) egg-yolk is added and the mixture is emulsified under vacuum to form the oil emulsion
      provided that the emulsifier of step ia) is not egg-yolk;
   ii) preparing a salad mixture from the oil emulsion and salad ingredients;

iii) placing and airtight closing of the salad mixture in a container;

iv) pasteurizing the container with the salad mixture under increased pressure; and v) cooling the pasteurized salad product such that the pasteurized salad product of v) comprises a stable oil-water emulsion.

2. The process as claimed in claim 1, wherein in step ia) 2-15% of the total quantity of oil is used.

3. The process as claimed in claim 1, wherein the oil emulsion formed in step ie) possesses the following composition (in % by weight):

| oil | ≦70 |
|---|---|
| water | 10-80 |
| egg-yolk | 2-10 |
| stabilizer | 0.1-5 |
| thickener | 0.1-5 |
| emulsifier | 0.1-5 |
| seasonings | 5-10. |

4. The process as claimed in claim 1, wherein the oil emulsion formed in step ie) possesses the following composition (in % by weight):

| oil | 20-75 |
|---|---|
| water | 20-70 |
| egg-yolk | 2-7 |
| stabilizer | 0.2-1 |
| thickener | 0.2-5 |
| emulsifier | 0.2-5 |
| seasonings | 8-15. |

5. The process claimed in claim 1, wherein the oil emulsion formed in step ie) possesses the following composition (in % by weight):

| oil | 25-75 |
|---|---|
| water | 20-70 |
| egg-yolk | 2-5 |
| stabilizer | 0.2-1 |
| thickener | 0.5-2.5 |
| emulsifier | 0.5-2.0 |
| seasonings | 8-15. |

6. The process as claimed in claim 1, wherein the pasteurization step iv) is performed at an internal temperature of 58°-98° C. and an overpressure of 0.5-2 bar.

7. The process as claimed in claim 6, wherein the pasteurization time amounts to 10-30 minutes.

8. The process as claimed in claim 1, wherein the cooling step v) is performed at a cooling temperature of 20°-5° C. and an overpressure of 0.5-2 bar.

9. The process as claimed in claim 8, wherein the cooling time amounts to 30-90 minutes.

10. A process for preparing an oil-water emulsion comprising oil, emulsifier, stabilizer, thickener, water, any seasonings, and egg-yolk, comprising the steps of:

ia) preparing a mixture of a part of the oil, emulsifier, stabilizer and thickener;

ib) adding water;

ic) preparing a pre-emulsion under vacuum;

id) adding the remainder of the oil and any seasonings to the pre-emulsion and emulsifying the mixture under vacuum to form the oil emulsion;

ie) adding egg-yolk and emulsifying the mixture under vacuum to form the oil emulsion;

provided that the emulsifier of step ia) is not egg-yolk and the oil emulsion of step ie) is stable when pasteurized in combination with salad ingredients.

11. The process as claimed in claim 10, wherein in step ia) 2-15% of the total quantity of oil is used.

12. The process as claimed in claim 10, wherein the oil emulsion formed in step ie) possesses the following composition (in % by weight):

| oil | ≦70 |
|---|---|
| water | 10-80 |
| egg-yolk | 2-10 |
| stabilizer | 0.1-5 |
| thickener | 0.1-5 |
| emulsifier | 0.1-5 |
| seasonings | 5-10. |

13. The process as claimed in claim 10, wherein the oil emulsion formed in step ie) possesses the following composition (in % by weight):

| oil | 20-75 |
|---|---|
| water | 20-70 |
| egg-yolk | 2-7 |
| stabilizer | 0.2-1 |
| thickener | 0.2-5 |
| emulsifier | 0.2-5 |
| seasonings | 8-15. |

14. The process claimed in claim 10, wherein the oil emulsion formed in step ie) possesses the following composition (in % by weight):

| oil | 25-75 |
|---|---|
| water | 20-70 |
| egg-yolk | 2-5 |
| stabilizer | 0.2-1 |
| thickener | 0.5-2.5 |
| emulsifier | 0.5-2.0 |
| seasonings | 8-15. |

15. The process as claimed in claim 1, wherein in step ia) 5-10% of the total quantity of oil is used.

16. The process as claimed in claim 2, wherein the oil emulsion formed in step ie) possesses the following composition (in % by weight):

| oil | ≦70 |
|---|---|
| water | 10-80 |
| egg-yolk | 2-10 |
| stabilizer | 0.1-5 |
| thickener | 0.1-5 |
| emulsifier | 0.1-5 |
| seasonings | 5-10. |

17. The process as claimed in claim 16, wherein the pasteurization step iv) is performed at an internal temperature of 58°-98° C. and an overpressure of 0.5-2 bar for a period of time in the range of 10-30 minutes and the cooling step v) is performed at a cooling temperature of 20°-5° C. and an overpressure of 0.5-2 bar.

18. The process as claimed in claim 10, wherein in step ia) 5-10% of the total quantity of oil is used.

19. The process as claimed in claim 11, wherein the oil emulsion formed in step ie) possesses the following composition (in % by weight):

| oil | ≦70 |
|---|---|

-continued

| | |
|---|---|
| water | 10–80 |
| egg-yolk | 2–10 |
| stabilizer | 0.1–5 |
| thickener | 0.1–5 |
| emulsifier | 0.1–5 |
| seasonings | 5–10. |

20. The process claimed in claim 18, wherein the oil emulsion formed in step ie) possesses the following composition (in % by weight):

| | |
|---|---|
| oil | 25–75 |
| water | 20–70 |
| egg-yolk | 2–5 |
| stabilizer | 0.2–1 |
| thickener | 0.5–2.5 |
| emulsifier | 0.5–2.0 |
| seasonings | 8–15. |

* * * * *